US009317977B2

(12) United States Patent
Amirpour et al.

(10) Patent No.: US 9,317,977 B2
(45) Date of Patent: Apr. 19, 2016

(54) MOBILE COMMUNICATION INTERFACE, SYSTEM HAVING A MOBILE COMMUNICATION INTERFACE, AND METHOD FOR IDENTIFYING, DIAGNOSING, MAINTAINING, AND REPAIRING A VEHICLE

(75) Inventors: Ramon Amirpour, Ebersbach (DE); Guenter Nobis, Nuertingen (DE); Roger Malmsheimer, Allmersbach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/124,336

(22) PCT Filed: May 23, 2012

(86) PCT No.: PCT/EP2012/059541
§ 371 (c)(1),
(2), (4) Date: Feb. 28, 2014

(87) PCT Pub. No.: WO2012/168071
PCT Pub. Date: Dec. 13, 2012

(65) Prior Publication Data
US 2014/0188331 A1 Jul. 3, 2014

(30) Foreign Application Priority Data
Jun. 8, 2011 (DE) ......................... 10 2011 077 196

(51) Int. Cl.
*G07C 5/00* (2006.01)
*G06F 17/00* (2006.01)
*G07C 5/08* (2006.01)

(52) U.S. Cl.
CPC ................ *G07C 5/008* (2013.01); *G07C 5/085* (2013.01)

(58) Field of Classification Search
USPC .......................................... 701/31.4; 705/400
See application file for complete search history.

(56) References Cited

U.S. PATENT DOCUMENTS 5,657,233 A * 8/1997 Cherrington et al. ......... 705/400
5,717,595 A * 2/1998 Cherrington et al. ......... 705/400
(Continued)

FOREIGN PATENT DOCUMENTS

| | | |
|---|---|---|
| CN | 1304487 A | 7/2001 |
| DE | 44 46 512 | 6/1996 |
| DE | 199 21 846 | 11/2000 |

OTHER PUBLICATIONS

International Search Report for PCT/EP2012/059541, dated Aug. 7, 2012.

*Primary Examiner* — Thomas G Black
*Assistant Examiner* — Tyler Paige
(74) *Attorney, Agent, or Firm* — Kenyon & Kenyon LLP

(57) ABSTRACT

A method for identifying and diagnosing a vehicle includes: storing customer, vehicle, and repair shop order data of the vehicle in a work data memory device of a mobile communication interface; connecting the mobile communication interface to the vehicle and connecting a first vehicle inspection device at least to the mobile communication interface at a first work station; carrying out a first set of inspections on the vehicle using the first vehicle inspection device and/or the mobile communication interface; carrying out a second set of inspections on the vehicle using a second vehicle inspection device and/or the mobile communication interface on the basis of the first inspection results; and storing the customer, vehicle, and repair shop order data as well as the first and second inspection results of the vehicle into the central customer database.

8 Claims, 5 Drawing Sheets

(56) References Cited

U.S. PATENT DOCUMENTS

| | | | | |
|---|---|---|---|---|
| 6,175,786 | B1 | 1/2001 | Takakura et al. | |
| 7,103,460 | B1 * | 9/2006 | Breed | 701/32.9 |
| 7,865,279 | B2 * | 1/2011 | Taki | 701/31.4 |
| 8,443,301 | B1 * | 5/2013 | Easterly et al. | 715/848 |
| 2008/0228344 | A1 | 9/2008 | Sampson et al. | |
| 2009/0216584 | A1 * | 8/2009 | Fountain et al. | 705/7 |
| 2009/0265057 | A1 | 10/2009 | Chinnadurai et al. | |
| 2010/0292890 | A1 | 11/2010 | Morris | |
| 2014/0188331 | A1 * | 7/2014 | Amirpour et al. | 701/31.4 |

* cited by examiner

MOBILE COMMUNICATION INTERFACE, SYSTEM HAVING A MOBILE COMMUNICATION INTERFACE, AND METHOD FOR IDENTIFYING, DIAGNOSING, MAINTAINING, AND REPAIRING A VEHICLE

BACKGROUND OF THE INVENTION

1. Field of the Invention

The present invention relates to a mobile communication interface, a system having a mobile communication interface, and a method for identifying, diagnosing, maintaining, and repairing a vehicle via a mobile communication interface, in particular in a motor vehicle repair shop.

2. Description of the Related Art

Published German patent application document DE 44 46 512 A1 discloses a device for carrying out a vehicle check using a mobile wireless part which relays diagnostic data from a vehicle to a repair shop.

Published German patent application document DE 199 21 846 A1 discloses a diagnostic test device having a portable inspection device for motor vehicles.

The technical development of motor vehicle inspection technology has resulted in a plurality of specific external inspection devices for different inspection fields and motor vehicle components. The vehicle inspection devices used for this purpose are highly specialized and adapted to the corresponding vehicle components. Vehicle inspection devices are frequently used at special work stations in a repair shop or an inspection site, for example, since the vehicle inspection devices are installed fixedly in the repair shop. A vehicle which is present in the repair shop for error diagnosis and/or repair is moved from work station to work station, depending on the inspection or repair to be performed.

In today's motor vehicles, many functions are carried out by electronic control units which are connected to the vehicle electronics system. The electronic control units often also take over the on board diagnostic functions of the vehicle systems and store special diagnostic and/or operating mode data. To be able to evaluate the data of the diagnostic functions from the control units, universal diagnosis testers have been developed which enable a communication with the control units present in the vehicle. The functionality of the communication may vary greatly and relates, for example, to reading out stored error codes, relaying actual values, carrying out complex actuator tests, resetting service intervals, breaking in installed replacement parts, and similar tasks.

Diagnostic testers usually include in this case an assembly which is responsible for the communication with the vehicle. Most of the time, this assembly is used as a vehicle communication interface (VCI). VCIs of this type may also be situated in their own housing and communicate with universal operating and display devices, such as laptops, PDAs, or smart phones, via wired or wireless transmission. The diagnostic functionality of universal diagnostic testers or operating and display devices is in this case ensured via a corresponding diagnostic software which enables the operation, the display, the diagnosis sequence control, and the communication with the electronic control units via the VCI.

The specialization of the vehicle inspection devices currently usually requires the combination of individual inspection and repair steps with communication steps and the evaluation of the data in the electronic control units.

Two basic approaches, which are schematically shown in FIGS. 6 and 7, have been established so far in the design of the inspection devices and repair shop visits.

FIG. 6 shows a vehicle 61 in a repair shop. Vehicle 61 includes here one or multiple electronic control units 62 which are installed in vehicle 61. During an inspection or repair sequence in a repair shop, vehicle 61 is moved to different work stations 65*a*, 65*b*, and 65*c* which may be spatially separated from one another. At each of work stations 65*a*, 65*b*, 65*c*, a specific vehicle inspection device or a universal operating and display device 64*a*, 64*b*, 64*c* is present which is assigned to the particular work station. Specific vehicle inspection devices 64*a*, 64*b*, 64*c* may be connected for inspection purposes to the components of vehicle 61, e.g., the exhaust, the engine, the air conditioner, or other components. At each work station, a universal diagnostic tester 63 associated with particular work station 65*a*, 65*b*, 65*c* is additionally provided, using which the communication with electronic control units 62 of vehicle 61 is established via a not illustrated standardized vehicle interface. Alternatively, the repair shop has only one universal diagnostic tester 63 which is moved from work station to work station as needed.

During a repair shop visit of vehicle 61, it is necessary that particular universal diagnostic tester 63 of each work station 65*a*, 65*b*, 65*c* is connected to the not illustrated standardized vehicle interface. The operation of diagnostic tester 63 and of particular vehicle inspection device 64*a*, 64*b*, 64*c* takes place separately. This may lead to manual input errors by the users of the devices. Moreover, a certain amount of additional time and effort is required for the repeated identification of vehicle 61 at each of work stations 65*a*, 65*b*, 65*c* by diagnostic tester 63.

FIG. 7 shows a different approach: A vehicle 71 having one or multiple installed electronic control units 72 passes through work stations 75*a*, 75*b*, 75*c* in a repair shop. There is a specific vehicle inspection device 74*a*, 74*b*, 74*c* at each of work stations 75*a*, 75*b*, 75*c*. Each of specific vehicle inspection devices 74*a*, 74*b*, 74*c* includes an integrated VCI 73*a*, 73*b*, 73*c*, with the aid of which a communication is established with electronic control units 72 in vehicle 71 via a not illustrated standardized vehicle interface. For this reason, the operation of a separate universal diagnostic tester in parallel to the vehicle inspection device, as in FIG. 6, is dispensed with. Furthermore, a separate identification of vehicle 71 is, however, necessary at different work stations 75*a*, 75*b*, 75*c* by particular integrated VCI 73*a*, 73*b*, 73*c*. Moreover, particular vehicle inspection devices 74*a*, 74*b*, 74*c*, in particular their inspection device software, must be adapted to integrated VCIs 73*a*, 73*b*, 73*c*. At a work station without a specific vehicle inspection device, a universal diagnostic tester having an integrated VCI may then be used.

FIG. 8 shows an improved vehicle inspection device set-up in a repair shop. A vehicle 10, in particular a motor vehicle, includes one or multiple electronic control units 10*a*. Electronic control unit (s) 10*a* may include specific control units for specific vehicle components or universal electronic control units 10*a* of vehicle 10. Electronic control units 10*a* may have available diagnostic data, error data, actual values, operating mode data, or similar vehicle-relevant data for specific vehicle components via a not illustrated standardized vehicle interface and may be transferred into certain operating modes or sequences.

Electronic control unit(s) 10*a* is/are connected to a VCI 1 via a not illustrated standardized vehicle interface. VCI 1 may be connected to vehicle 10 at the beginning of a repair shop visit, e.g., at the vehicle drop-off point. VCI 1 may be configured to store unambiguous identification data of vehicle 10, e.g., the vehicle owner, the license plate number, the vehicle make, the vehicle manufacturer, the chassis number, or similar identification data. The unambiguous identification data may in this case be reentered at the vehicle drop-off of the repair shop with the aid of a universal operating and display device or retrieved from a previous repair shop visit from a central repair shop data base.

VCI 1 is configured to be moved along with vehicle 10 in the repair shop when vehicle 10 is moved through work stations 42, 43, 44. At work stations 41, 42, 43, 44, specific vehicle inspection devices or universal operating and display devices 3*a*, 3*b*, 3*c* are located which are equipped with a standardized diagnostic server device 2. Diagnostic server device 2 is configured in each case to establish a communication with VCI 1 and thus with electronic control unit(s) 10*a* of vehicle 10. In this case, specific vehicle inspection devices 3*a*, 3*b*, 3*c* may be connected at every work station to the particular vehicle components of vehicle 10 to carry out the diagnosis and/or repair work of vehicle 10.

In this way, information regarding vehicle 10 as well as identification data of vehicle 10 are available rapidly and easily at every work station 42, 43, 44. Data, such as diagnostic data, repair data, maintenance data, measurement results, setting parameters and the like, must, however, be secured in a vehicle-specific manner. Until now, a repair shop network has been used to which all vehicle inspection devices or universal operating and display devices 3*a*, 3*b*, 3*c* are connected. Via the repair shop network, work station-related and vehicle-specific data may be stored and retrieved at every work station 42, 43, 44.

The repair shop interconnection is, however, associated with costs which may be due to a necessary installation or due to an operation of such a network. There is therefore a demand for efficient and cost-effective approaches to collect and store vehicle-specific data in the course of a repair shop visit.

BRIEF SUMMARY OF THE INVENTION

The identification of a vehicle, which is necessary for a plurality of work steps in a repair shop or inspection site, is carried out only once at the beginning of the repair shop visit or the inspection site visit. As soon as the vehicle has been identified once with the aid of unambiguous identification data, the unambiguous identification data are stored in a VCI connected to the vehicle and are moved along with the vehicle from work station to work station. For this purpose, the VCI remains in the particular vehicle until the end of the repair shop visit.

The present invention is now based on the concept of also using the VCI, which is moved along with the vehicle in the repair shop anyway, as a temporary data memory for the customer order, diagnostic, maintenance, and repair results, i.e., the relevant data and parameters of the particular vehicle in each case. For this purpose, data concerning the customer and his/her vehicle are read out from the central customer data base or recorded for a new customer at the beginning of the repair shop visit; then, the customer order which was discussed with the customer is supplemented in the central customer database and subsequently, all information available now for the relevant vehicle in the customer database are stored in the VCI which is installed into the relevant vehicle for the duration of the repair shop visit or which has already been installed.

For this reason, a complex and costly IT network is no longer necessary in the repair shop for providing the customer, customer order, and vehicle data at every work station of the repair shop as well as for detecting the data to be stored at every work station during the duration of the repair shop visit and for providing these data at every other work station during the repair shop visit, since they are stored, initially specifically to the vehicle, in the mobile VCI from the beginning until the end of the repair shop visit at all work stations for all vehicle inspection devices or universal operating and display devices, and may only be collected and transferred to a central customer database, which is, however, not connected to the work stations of the repair shop, after the termination of the repair shop visit.

During the repair shop visit, vehicle inspection devices and/or universal operating and display devices present at the particular work stations may initiate a communication with the VCI of the vehicle present at the work station, retrieve the unambiguous identification data of the vehicle, the customer order and already present diagnostic results of chronologically previous work steps, and, for example, exchange the diagnostic information with the vehicle control units. In addition, all results, data, and parameters which are incurred at the particular work station may be stored in the VCI specifically to the vehicle. This saves the particular user of the vehicle inspection device and/or of the universal operating and display device from installing and uninstalling the VCI as well as the time needed for a complex identification of the vehicle and for establishing communication with the control units installed in the vehicle, and also from securing the work station-related data in a central place, such as a repair shop server. In this way, it is possible to considerably increase the efficiency of the work sequences, especially also in smaller repair shops without their own repair shop network.

The present invention therefore provides a method for identifying, diagnosing, maintaining, and repairing a vehicle in a repair shop, including the steps:

indentifying a vehicle data set which is already present for a customer and his/her vehicle, which is to be diagnosed, maintained, and/or repaired, in a central customer database or entering the customer and vehicle data in a new data set;

supplementing this vehicle data set by a customer order;

storing the vehicle data set associated with a vehicle from the central customer database into a work data memory device in a mobile communication interface;

installing a mobile communication interface into the vehicle associated with the stored vehicle data set;

connecting a mobile communication interface to the vehicle and connecting a first vehicle inspection device at least to the mobile communication interface at a first work station;

reading out the vehicle data set stored in the mobile communication interface into the first inspection device;

supplementing the identification data of the vehicle using the first vehicle inspection device if necessary and carrying out a first set of inspections in the vehicle using the first vehicle inspection device and/or the mobile communication interface;

supplementing the vehicle data set with the identification data, supplemented if necessary, and first inspection results, and storing the vehicle data set expanded in the first vehicle inspection device in the work data memory device of the mobile communication interface by the first vehicle inspection device;

disconnecting the first vehicle inspection device from the vehicle;

connecting a second vehicle inspection device to the vehicle and reading out the vehicle data set stored in the mobile communication interface and including the first inspection results from the work data memory device of the mobile communication interface into the second vehicle inspection device at a second work station;

supplementing the identification data of the vehicle using the second vehicle inspection device if necessary and carrying out a second set of inspections on the vehicle using the second vehicle inspection device and/or using the mobile communication interface connected to the vehicle on the basis of the first inspection results;

supplementing the vehicle data set with the identification data, supplemented if necessary, and second inspection results, and storing the vehicle data set expanded in the second vehicle inspection device in the work data memory device of the mobile communication interface by the second vehicle inspection device;

uninstalling the mobile communication interface from the vehicle upon the completion of the repair shop visit; and storing the vehicle data set, supplemented with all results of the repair shop visit and stored in the mobile communication interface, in the central customer database.

According to another specific embodiment, the present invention provides a mobile communication interface for identifying a vehicle and for communicating with the electronic control units, installed in the vehicle, in a repair shop, having a connecting device which is configured to connect a vehicle in a repair shop to the mobile communication interface, a work data memory device which is configured to store vehicle data sets from a central customer database or vehicle data sets of additional vehicle identification data, inspection, diagnostic, and/or maintenance result data from the inspection, diagnostic, and/or maintenance steps carried out on the vehicle, supplemented by a vehicle inspection device, and a communication device which is configured to transfer, preferably wirelessly, these expanded vehicle data sets to the vehicle inspection devices or the central customer database and to exchange information between the electronic control units installed in the vehicle and the vehicle inspection devices at different work stations in the repair shop.

According to another specific embodiment, the present invention provides a system for identifying, diagnosing, maintaining, and repairing a vehicle in a repair shop, having a mobile communication interface according to the present invention, a central customer database, and a plurality of vehicle inspection devices, each having a diagnostic server device for establishing a communication with the mobile communication interface and through the mobile communication interface with the electronic control units installed in the vehicle, an operating and display device for controlling the vehicle inspection device and the mobile communication interface, and different vehicle inspection modules which are configured to carry out inspection device-specific vehicle inspections on the vehicle based on the inspection, diagnostic, and/or maintenance result data.

DETAILED DESCRIPTION OF THE INVENTION

Figure 1:
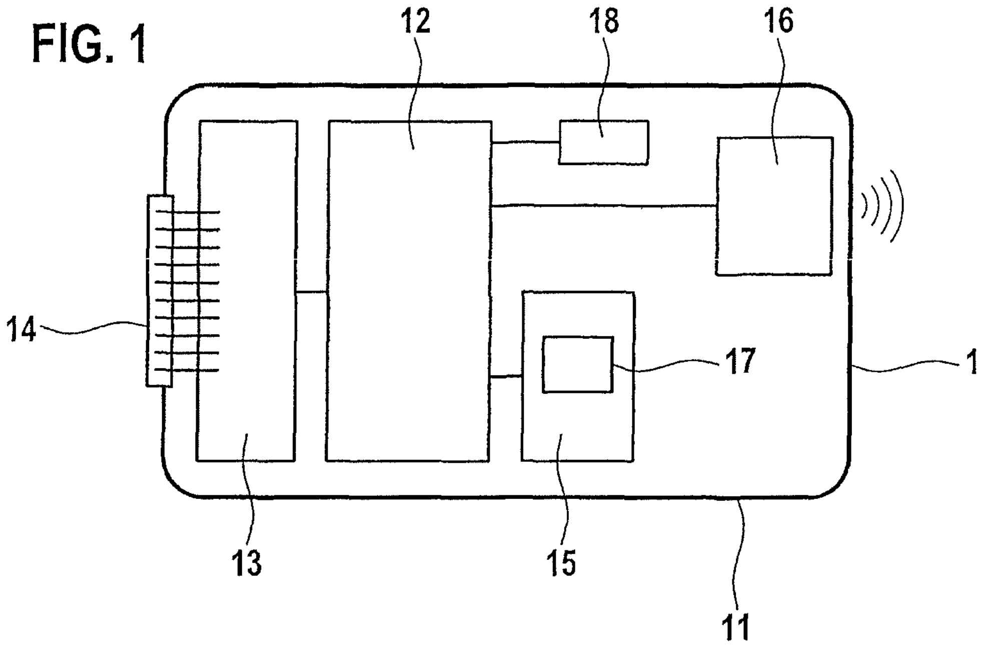
FIG. 1 shows a schematic representation of a VCI according to one specific embodiment of the present invention.

In the figures of the drawing, elements, features, and components which are identical or have identical functions are each identified with identical reference numerals, unless otherwise indicated. It is understood that the components and elements in the drawings are not necessarily true to scale to one another for the sake of clarity and comprehensibility.

In the sense of this application, the vehicle inspection devices are not limited to specific vehicle inspection devices. They may, for example, include axle measurement testers, engine testers, emission testers, brake testers, shock absorber testers, track testers, weighing devices, brake fluid testers, sound level meters, diesel exhaust gas testers, chassis measuring devices, toe angle measuring devices, steering angle testers, air conditioner testers, and the like. These vehicle inspection devices may be used in repair shops, in particular motor vehicle repair shops, inspection sites, or similar facilities. In particular, the methods and devices according to the present invention are likewise usable in these facilities.

In the following, communication interfaces for vehicles are described which are referred to as vehicle communication interfaces, in short VCI, in the sense of this application. In particular, these communication interfaces are mobile interfaces which may be moved along with the vehicle in a repair shop from work station to work station.

FIG. 1 shows a schematic representation of a VCI 1 according to one specific embodiment of the present invention. VCI 1 is situated in a housing 11 and includes a microprocessor 12, a connecting device 13 having a plug connector 14 for connecting VCI 1 to a standardized vehicle interface in a vehicle, a memory device 15 for storing unambiguous identification data of the vehicle to be connected, a communication device 16 for establishing a communication connection to diagnostic server devices 2 of specific vehicle inspection devices, and a work data memory device 18 which is connected to the microprocessor.

Microprocessor 12 is configured to evaluate control instructions for VCI 1 and to control connecting device 13, memory device 15, communication device 16, and work data memory device 18. Microprocessor 12 may naturally also include a microcontroller, an ASIC, or a similar device.

Connecting device 13 may be configured to provide, at a lower communication layer, in particular a bit transmission layer ("physical layer"), interfaces for diagnostic bus systems of the vehicle to be connected. Electronic control units of the vehicle may be addressed via the diagnostic bus systems.

Memory device 15 may have a relatively large memory volume in comparison to conventional VCIs in order to provide an appropriate amount of memory space for the unambiguous identification data of the vehicle and to store the configuration data of microprocessor 12, connecting device 13, and communication device 16. Memory device 15 includes corresponding software 17 which is specific for the operation of VCI 1. Software 17 is described in greater detail below for FIG. 2.

Communication device 16 is configured to establish a communication connection with diagnostic server devices 2 of specific vehicle inspection devices and the central customer database. For this purpose, communication device 16 may have means for establishing a wired or wireless connection, e.g., a wireless module for Bluetooth or WLAN, an infrared interface, an RFID transponder, or the like.

VCI 1 does not include any operation or display elements in the present example. The operating and display elements may, for example, be provided via the vehicle inspection devices to be connected to VCI 1 or via universal operating and display devices. It may naturally also be possible to equip VCI 1 with its own operating and display elements.

Work data memory device 18 is configured to store all data which are necessary to carryout all diagnostic, maintenance, and repair steps at the work stations of a repair shop. In addition to the unambiguous identification data stored in memory device 15, these include customer data, such as name, phone number, email address, mailing address or the like, order data, such as order number, order date, information regarding agreed-on services and work steps agreed on subsequently and the like, information regarding the vehicle, such as a license number, a serial number, mileage, detailed operating parameters of the vehicle, e.g., model year, model range, transmission type, engine type, activation parameters for the control units installed in the vehicle, maintenance work already carried out, information regarding replaced parts or the like, post-identification data of the vehicle and documentation data of all diagnostic, maintenance, inspection, and repair results, such as work step sequence, measuring parameters, serial numbers of replaced parts, setting parameters of newly installed, maintained, or repaired vehicle components and the like. The data stored in work data memory device 18 are basically provided to make available all necessary information regarding the associated vehicle at every work station of the repair shop for the vehicle inspection devices located there or for the universal display and operating devices and for the repair shop computer having the central customer database, without the need for exchanging information via a repair shop network. The vehicle data are in particular provided to unambiguously identify the vehicle with regard to important operating parameters, setting parameters, and activation parameters of all components installed in the vehicle.

Work data memory device 18 may alternatively also be combined with memory device 15; in this case, a correspondingly larger memory volume and a memory area separation may be provided between the data of memory device 15 and the data of work data memory device 18. Work data memory device 18 may also have software which is similar to software 17 of memory device 15. It may also be provided that software 17 is expanded in the case of a joint design of memory device 15 and work data memory device 18 in such a way that both memories may be accordingly operated and activated.

Figure 2:
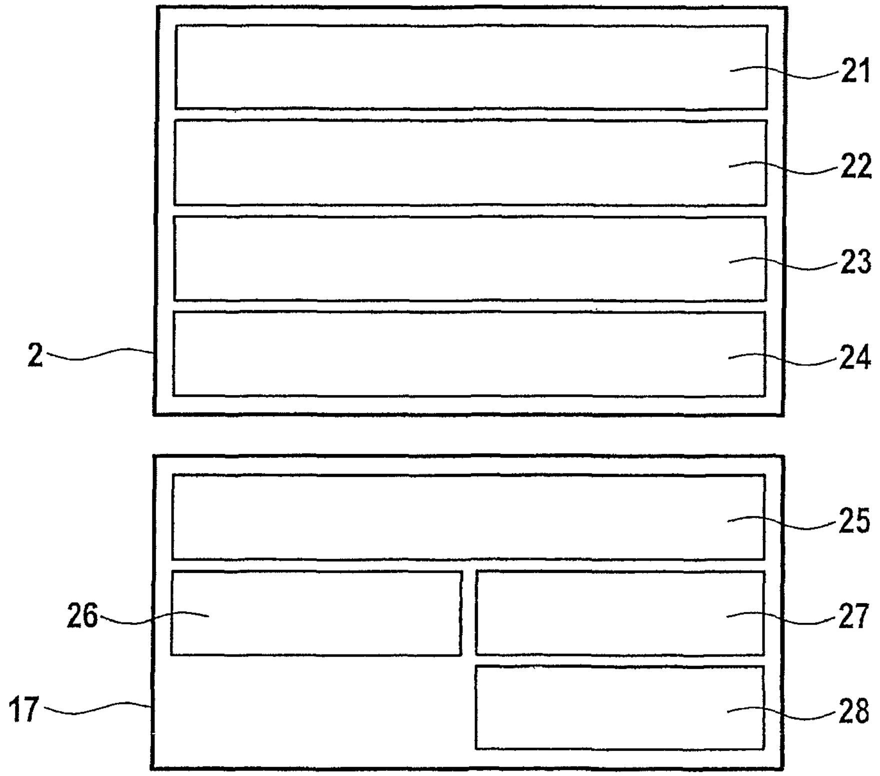
FIG. 2 shows a schematic representation of the software architecture of a VCI and of a diagnostic server device according to another specific embodiment of the present invention.

FIG. 2 shows a schematic representation of the software architecture of a VCI, in particular of VCI 1, and of a diagnostic server device 2.

In this case, software 17, which may be stored in a memory device 15 of VCI 1 from FIG. 1, includes a first communication layer 25, a memory software 26, a protocol software 27, and a second communication layer 28. Individual software components 25, 26, 27, and 28 may be combined in a software code. It is also possible for software 17 to have additional software components.

First communication layer 25 is configured to establish a communication with a communication layer 24 of a diagnostic server device 2 or a communication layer (not illustrated) of a central customer database and to control the VCI. Memory software 26 is configured to receive, store, and manage the unambiguous identification data for vehicle 10. The unambiguous identification data may preferably be kept for the duration of a repair shop stay of vehicle 10 and, if necessary, output via diagnostic server device 2 to the specific vehicle inspection devices. It may furthermore be provided to transfer data from work data memory device 18 to the vehicle inspection devices via diagnostic server device 2, if necessary.

Protocol software 27 is configured to provide the necessary protocols of the communication with vehicle 10 and/or diagnostic server device 2. Second communication layer 28 is configured to control the communication connections established with the control units in vehicle 10 via connecting device 13 in FIG. 1.

Diagnostic server device 2 includes as software components a communication layer 21, a software interface 22, a diagnostic server software 23, and a second communication layer 24.

Second communication layer 24 may be used for communicating with first communication layer 25 of software 17 of VCI 1. Second communication layer 24 of diagnostic server device 2 may furthermore be configured to register which VCI 1 is located in the range of the vehicle inspection device containing diagnostic server device 2. This information may change dynamically with the movement of a plurality of vehicles provided with VCI 1 within a repair shop. In particular, VCIs 1 may be configured via communication devices 16 to display their presence via beacon signals to particular diagnostic server devices 2 in a repair shop. Here, the range of VCIs 1 may be predetermined.

First communication layer 21 of diagnostic server device 2 may be configured to provide an interface for specific vehicle inspection devices, in particular for the vehicle inspection device into which diagnostic server device 2 is integrated. First communication layer 21 may be configured to provide functions of the control unit communication. This includes, for example, reading out errors, actual values, operating mode data, deleting and overwriting values in control units, e.g., of service intervals, error registers, actuator activations, carrying out complex inspection sequences such as a steering angle calibration, an ABS sensor inspection, a pump inspection, a brake circuit bleeding, and the like. First communication layer 21 is furthermore configured to relay unambiguous vehicle identifications from the electronic control units of vehicle 10, to be connected, to the specific vehicle inspection devices and the VCI. First communication layer 21 may in this case be adapted to the specific vehicle inspection device, e.g., using a preconfigured inspection device parameter set which may be retrieved from the vehicle inspection device.

Figure 3:
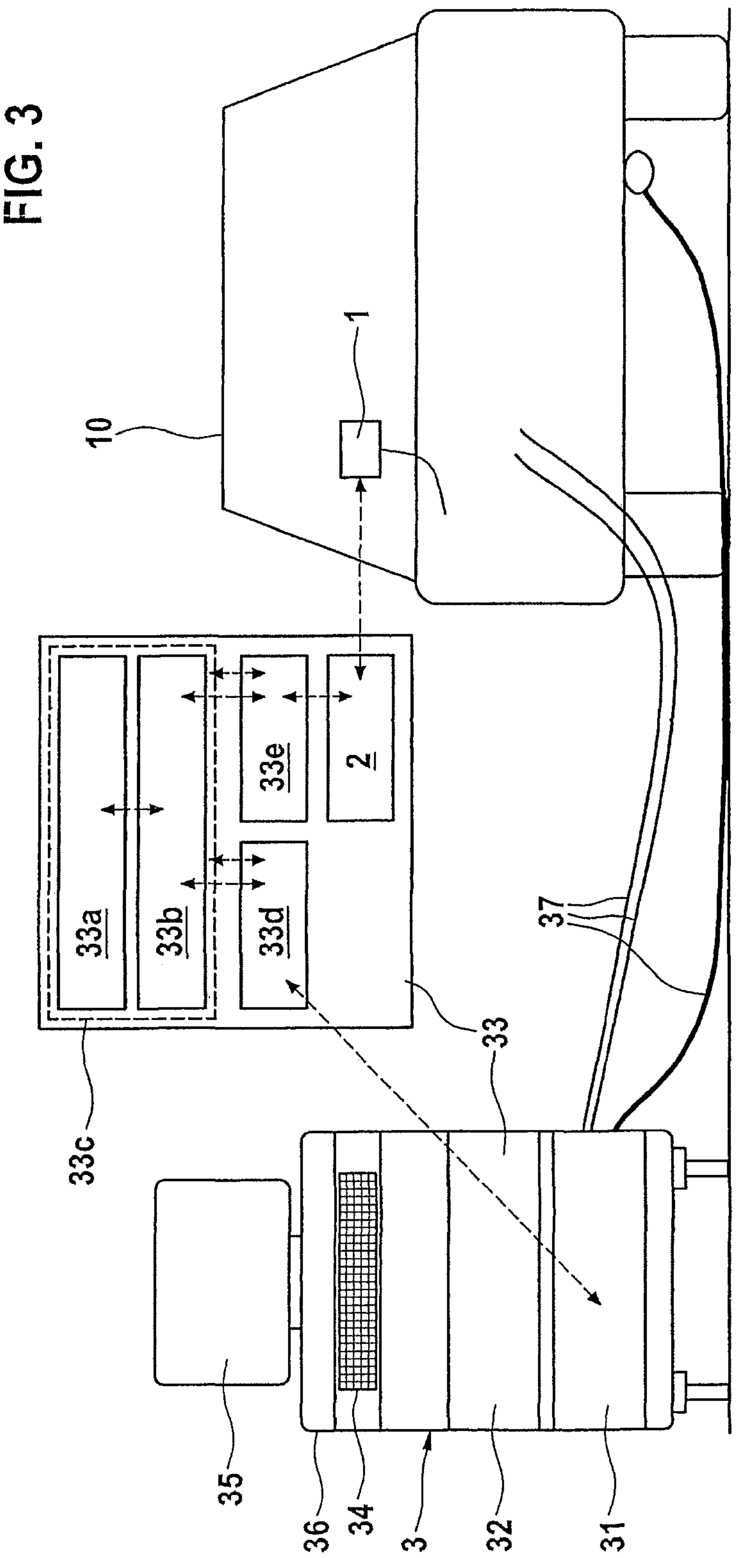
FIG. 3 shows a schematic representation of the setting of a repair shop work station having a system according to another specific embodiment of the present invention.

FIG. 3 shows a schematic representation of the setting of a repair shop work station having a system including a mobile communication interface.

A vehicle 10 is shown to which a VCI 1 according to FIG. 1 is connected. Vehicle 10 is located at a work station in a repair shop or inspection site at which a corresponding vehicle inspection device 3 is present. Vehicle inspection device 3 includes an inspection module 31, a control computer 32 having control software 33, an operating device 34, and a display device 35. Vehicle inspection device 3 may be connected to vehicle 10 or to the vehicle components of vehicle 10, such as the exhaust, the engine, the air conditioner, the braking system, or the like, via cables, sensors, hoses, and similar suitable connecting means 37. Vehicle inspection device 3 may be situated in a housing 36. Vehicle inspection device 3 may be accommodated in a trolley, for example, or fixedly connected to the repair shop floor at the work station.

Inspection module 31 may have a specific vehicle inspection module which may carry out predefined inspections or a diagnosis with regard to certain vehicle components of vehicle 10, e.g., engine tests, chassis measurement, air conditioning service, or the like. Control computer 32 may be configured to control the corresponding specific functions of inspection module 31 with the aid of control software 33.

Control software 33 is shown in the offset box in FIG. 3 in larger detail. Control software 33 includes a software layer 33*a* for operating vehicle inspection device 3 as well as for visualizing the inspection sequences and results, a software layer 33*b* for controlling the inspection sequences, a first communication layer 33*d*, which establishes a communication between the inspection sequence control through software layer 33*b* and inspection module 31, a second communication layer 33*e*, which establishes a communication of the inspection sequence control through software layer 33*b* and of diagnostic server device 2, a diagnostic server device 2 according to FIG. 2 as well as a detection software component 38.

Software layers 33*a* and 33*b* for operation, display, and inspection sequence control may also be integrated into a joint software layer 33*c*. Second communication layer 33*e* may have a software component for communicating with the user, a software component for establishing a communication with diagnostic server device 2, a software component for the communication of the inspection sequence control with diagnostic server device 2 during an inspection sequence, and an inspection device parameter set.

Communication layer 33*e* may be configured to display a list of vehicles 10, whose VCI 1 is in the range of diagnostic server device 2 or the particular work station, to a user of vehicle inspection device 3 via display unit 35. In this way, the user may select the correct vehicle via operating device 34 from the list of vehicles 10 in question. Preferably, by selecting a vehicle 10 on a vehicle inspection device 3, corresponding VCI 1 may be blocked for selection at other work stations or together with other vehicle inspection devices. Thus, errors may be advantageously prevented during the vehicle selection process.

At the beginning of the actual inspection sequence in the previous work steps of the repair shop visit, communication layer 33*e* may receive already stored identification data from VCI 1 of vehicle 10 and relay them to software layer 33*b* for inspection sequence control. In this way, the inspection sequence may advantageously be adapted automatically to vehicle 10. During the inspection sequence, communication layer 33*e* may also activate functions in the electronic control units of vehicle 10 and dynamically relay diagnostic data from the electronic control units of vehicle 10 to software layer 33*b* during the inspection sequence.

Communication layer 33*e* may furthermore advantageously receive preconfigured parameters of specific inspection module 31 to activate or deactivate in a targeted manner certain functions of the electronic control units of vehicle 10. In this way, the functional scope of the electronic control units, which is usually large, may be reduced to the functions needed for the particular inspection sequence in order to avoid errors by the user during the operation of vehicle inspection device 3.

Advantageously, communication layer 33*e* may also be designed to store data, work results, and parameters which are incurred during work using vehicle inspection device 3 on vehicle 10 in the work data memory device of VCI 1 via diagnostic server device 2. It may furthermore be possible to read in data, work results, and parameters, which are already stored in the work data memory device and which have, for example, been stored in the previous work steps at other work stations of the repair shop, via communication layer 33*e* into vehicle inspection device 3. The read-in data may in this case, for example, be used by vehicle inspection device 3 as the basis for inspection, maintenance, or repair work.

Figure 4:
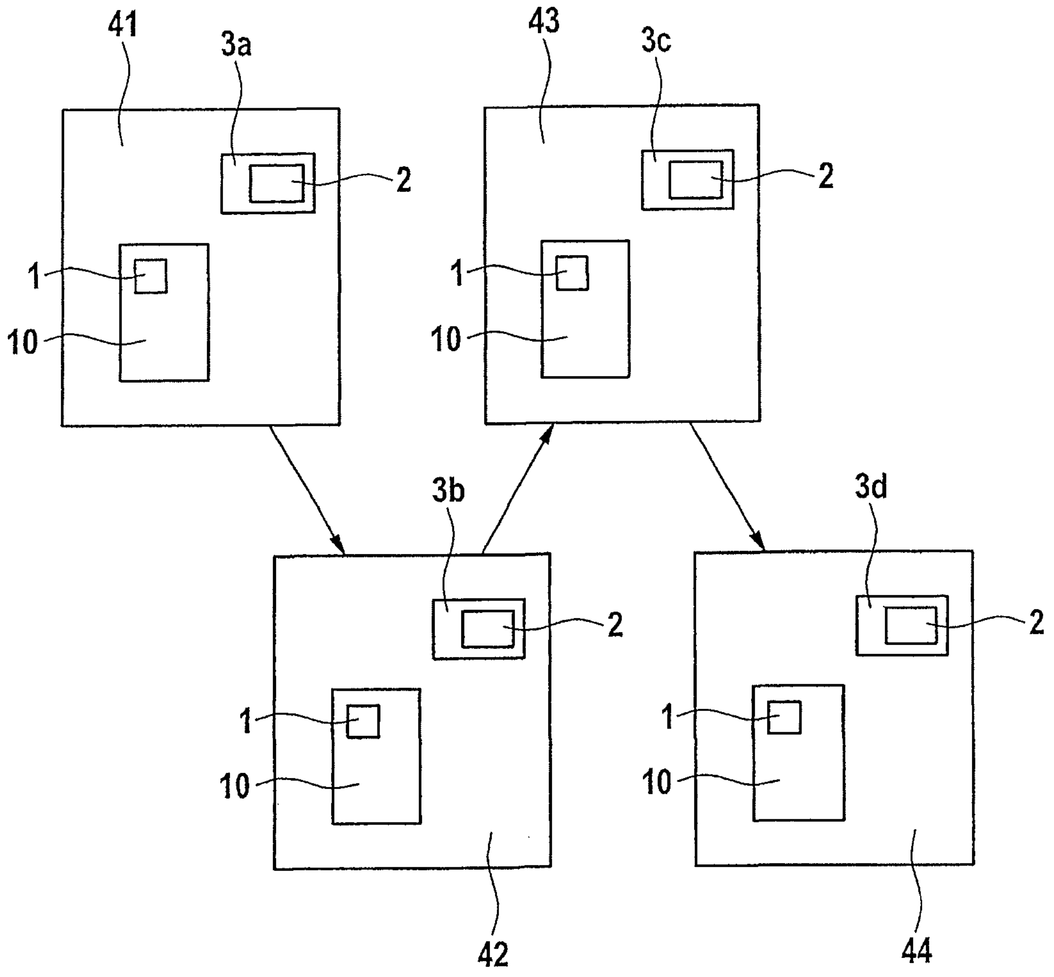
FIG. 4 shows a schematic representation of a method for identifying, diagnosing, maintaining, and repairing a vehicle in a repair shop via a VCI according to another specific embodiment of the present invention.
Figure 5:
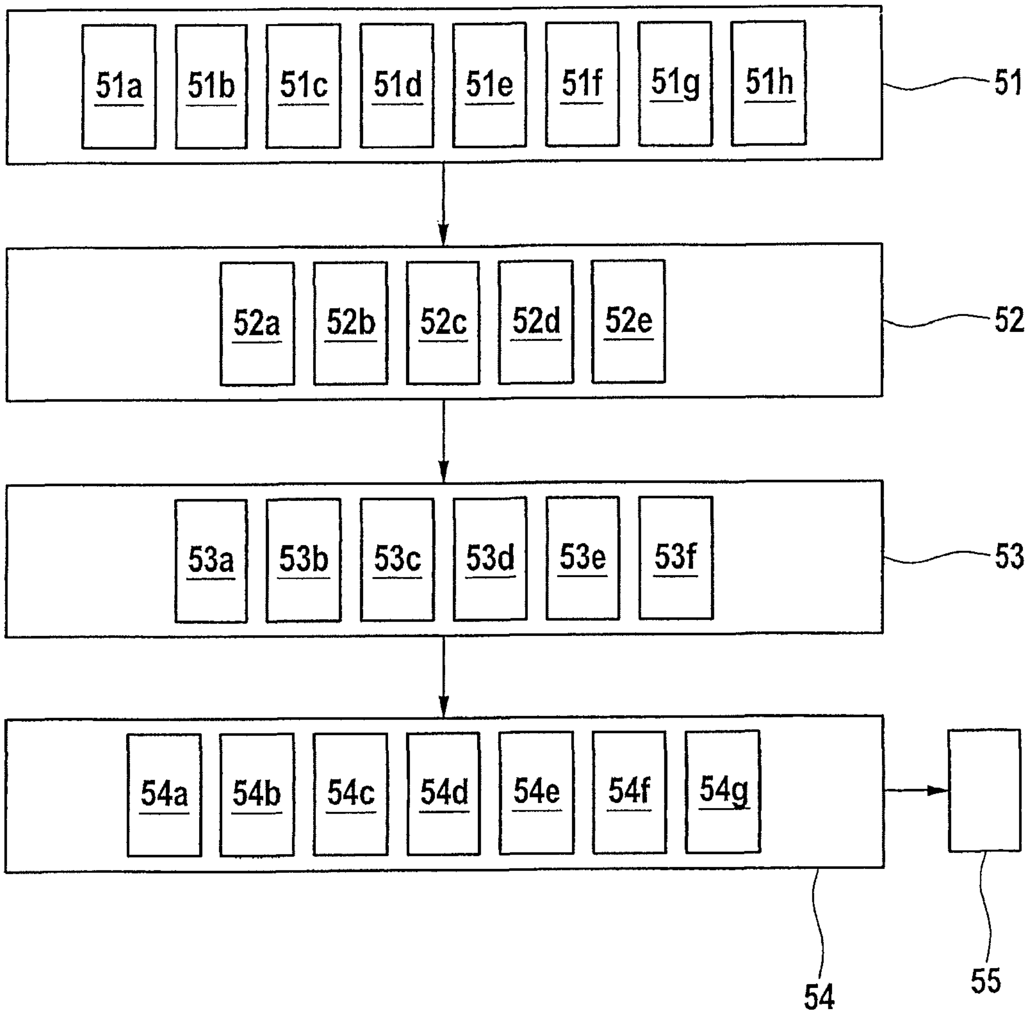
FIG. 5 shows a schematic representation of a method for identifying, diagnosing, maintaining, and repairing a vehicle in a repair shop via a VCI according to another specific embodiment of the present invention.
Figure 6:
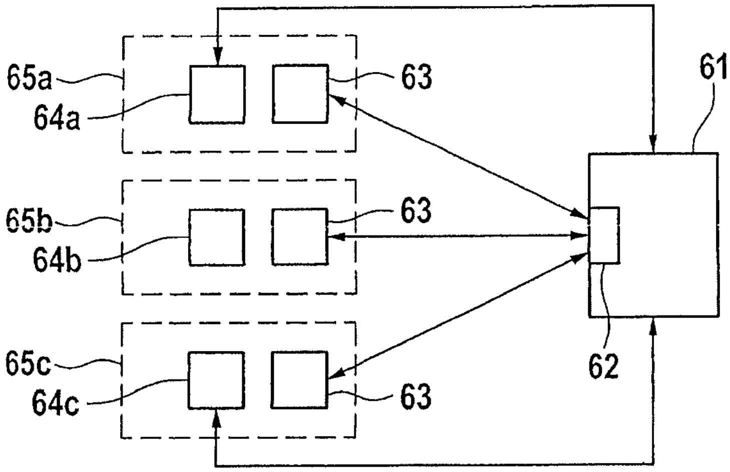
FIG. 6 shows a schematic representation of a conventional vehicle inspection device set-up in a repair shop.
Figure 7:
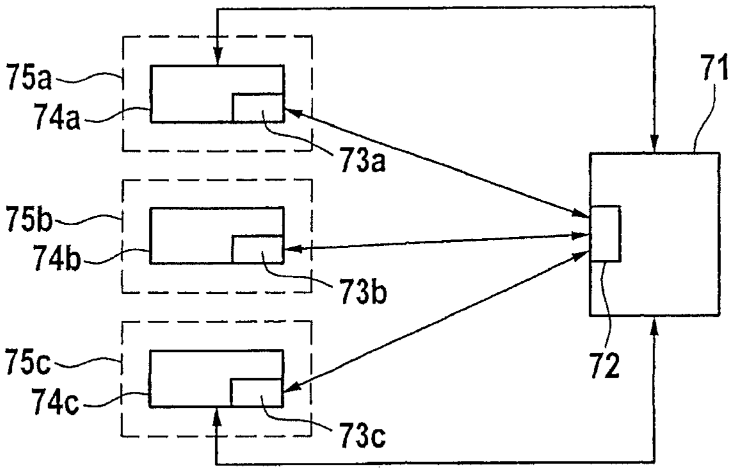
FIG. 7 shows a schematic representation of another conventional vehicle inspection device set-up in a repair shop.
Figure 8:
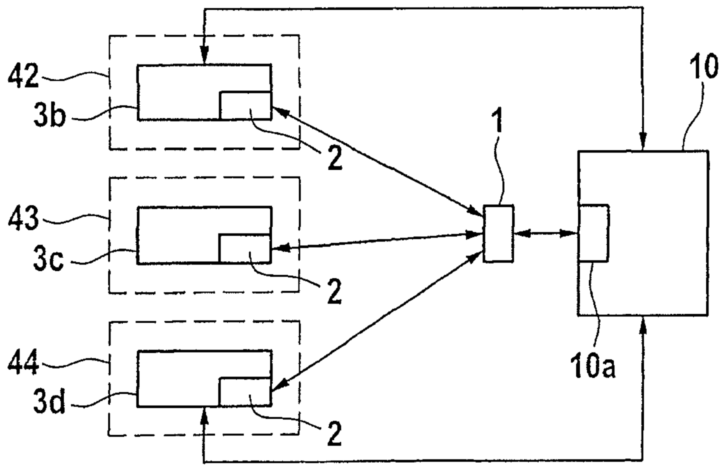
FIG. 8 shows a schematic representation of a vehicle inspection device set-up in a repair shop.

FIG. 4 shows a schematic representation of a method for identifying, diagnosing (inspecting), maintaining, and repairing a vehicle 10 in a repair shop using a VCI 1 according to FIG. 1 according to another specific embodiment of the present invention. The sequence of the method according to FIG. 4 is explained in greater detail with reference to the steps of the schematic representation, shown in FIG. 5, of a method for identifying, diagnosing, maintaining, and repairing a vehicle in a repair shop via a VCI 1 according to another specific embodiment of the present invention.

After incorporating the customer and vehicle data into a customer data set in the central customer database of a repair shop computer (step 51*a*) and asking the customer for error symptoms (step 51*b*), a repair shop order is prepared and stored in the customer data set in the central customer database (step 51*c*). The repair shop order may, for example, be printed and signed by the customer. The customer data set having the customer and vehicle data, the error symptoms, and the repair shop order is stored in a work data memory device of VCI 1 (step 51*d*). At a first work station 41, e.g., the vehicle drop-off of a repair shop, vehicle 10, to be maintained or repaired, may be connected to VCI 1 (step 51*e*). At first work station 41, a first vehicle inspection device 3*a* may be provided which is equipped with a standardized diagnostic server device 2. First vehicle inspection device 3*a* may, for example, be a universal operating and display device which is used for a rapid diagnostic test of vehicle 10. At first work station 41, unambiguous vehicle identification data are furthermore ascertained (step 51*f*) and relayed to VCI 1, in which the identification data are stored (step 51*f*) at least for the duration of the repair shop visit, via vehicle inspection device 3*a* having diagnostic server device 2. Furthermore, it is, for example, possible, by detecting all error storage inputs in the electronic control units of vehicle 10, to carry out (step 51*g*) a rapid diagnostic test using VCI 1, after the completion of which the result of the diagnostic test is also stored (step 51*h*) in the work data memory device of VCI 1.

Then, vehicle 10 is moved to a second work station 42 within the repair shop. VCI 1 is not disconnected from vehicle 10 during this process and is moved along with vehicle 10. Second work station 42 may, for example, be a work station for diagnosing and troubleshooting (step 52). At second work station 42, there is a second vehicle inspection device 3*b* or a universal operating and display device 3*b* having an integrated diagnostic server device 2. Second vehicle inspection device 3*b* establishes a communication with VCI 1 and automatically reads out of VCI 1 (step 52*a*) the stored unambiguous identification data and the vehicle-related data stored so far in the work data memory device of VCI 1. Vehicle 10 may be analyzed and subsequently identified more accurately (step 52*b*), if necessary. After carrying out the error search (step 52*c*) with the aid of the post-identification data, it is, for example, possible to identify (step 52*d*) an erroneous steering angle sensor. The result of the diagnosis and, if necessary, the post-identification data may in turn be used to create (step 52*e*) a memory input in the work data memory device of VCI 1.

Subsequently, vehicle 10 is moved again together with VCI 1 to a third work station 43 having a third vehicle inspection device or a universal operating and display device 3*c*. Third work station 43 may in this case be a repair work station, for example. After procuring a replacement part (step 53*a*), a defective vehicle component, e.g., a defective steering angle sensor, may, for example, be uninstalled (step 53*b*) and replaced by a replacement part (step 53*c*) at the third work station. With the aid of diagnostic server device 2, a communication with VCI 1 may be established via vehicle inspection device 3*c* and thus with one or multiple electronic control units in vehicle 10, so that all vehicle-related data may initially be read out of VCI 1 (step 53*d*) and then the new steering angle sensor may, for example, be registered or broken in (step 53*e*) in the appropriate electronic control unit of vehicle 10. The result of the breaking in and setting step is in turn stored in the work data memory device of VCI 1 (step 53*f*).

After the repair, vehicle 10 is taken to a fourth work station 44 at which the data stored so far are initially read out (step 54*a*) of the work data memory device of VCI 1. Subsequently, after an optional post-identification, the vehicle geometry of vehicle 10 may be measured, for example, at the fourth work station and the chassis may be set (step 54*b*). For this purpose, a fourth vehicle inspection device 3*d*, e.g., an inspection device for chassis measurement, is provided at fourth work station 44. With the aid of the communication between fourth vehicle inspection device 4*d* and VCI 1, the newly installed steering angle sensor may be automatically calibrated (step 54*c*) by vehicle inspection device 3*d* after the completion of the chassis measurement and setting, since the necessary identification and diagnostic result data of vehicle 10 are already present in VCI 1. The identification data of vehicle 10 may also already be used for preparing the measurement and setting of the chassis. After storing the measurement results and the setting parameters (step 54*d*), a test drive may, for example, be carried out (step 54*e*). After a successful test drive, VCI 1 may be disconnected again from vehicle 10 (step 54*f*) upon completion of the repair shop visit. All inspection, maintenance, repair, diagnostic, and identification data collected in the work data memory device of VCI 1 up until this point in time may then be transferred (step 54*g*) from VCI 1 into a customer database. In a step 55, the repair shop order may then be completed, and the data and the result protocols of the repair shop visit may be stored in a central repair shop system for repeated use during a future repair shop visit of the customer or vehicle 10.

Many advantages result from using VCI 1 as well as the method for identifying, diagnosing, maintaining, and repairing a vehicle in a repair shop. The identification of the vehicle necessary for the control unit communication is carried out only once per repair shop visit and is expanded at individual work stations or by individual vehicle inspection devices only as needed. This results in a significant amount of time being saved during the repair shop visit. Once detected, the vehicle identification data are equally available at every work station, since they are moved along with the vehicle from work station to work station via the VCI. The risk of operating errors or erroneous inputs during the identification of vehicles is also reduced, since, on the one hand, the identification data may be automatically retrieved from the VCI, and, on the other hand, every vehicle in the repair shop may be activated for processing only at a single work station. Specific vehicle inspection devices and universal operating and display devices may be equipped with a standardized diagnostic server device, and there is no need for a complex adaptation process to the particularities of the individual vehicle inspection device.

Depending on the functionality scope of the particular work station, the control software of the vehicle inspection device is able to only activate those functions during its communication with the electronic control units of the vehicle which are in fact needed for the particular work station. This enables a simple and advantageous handling of the particular specific vehicle inspection devices or universal operating and display devices at the specific work stations in the repair shop. The users of the vehicle inspection devices at the work stations will not need as many required qualifications when handling the control unit communication, since the communication between the electronic control units in the vehicle and the vehicle inspection devices may take place in the background and automatically to the greatest possible extent.

By storing all relevant vehicle-related data in the work data memory device of VCI 1, a complex network approach may be dispensed with within the repair shop. The central customer database may therefore be operated only at one or two work station computers as the minimum option, for example. Naturally, it is also possible to provide a repair shop network in addition to storing the data on a VCI, for example, in order to provide greater data security or to have a backup option available in case of defects or glitches.

The selection of order and/or vehicle to be carried out at the different work stations may be dispensed with, since all necessary information is already moved along with the vehicle in the VCI from work station to work station. In particular, a dynamic updating of the order status is ensured, since results obtained and parameters ascertained at every work station may be stored in the VCI. In this way, a redundant post-identification may be dispensed with at some work stations if this post-identification has already taken place in a previous work step.

With the aid of the work data memory device in the VCI, an efficient repair shop visit may be ensured even under difficult boundary conditions when compared to network-dependent approaches. For example, problems which may occur in wireless networks, such as strong interference radiation, poor building topology or the like, are no longer an issue. Furthermore, the system is independent of the distance to the repair shop, so that the vehicle-related data are always available via the VCI in the case of test drives outside of the repair shop, for example.

What is claimed is:

1. A method for identifying and diagnosing a vehicle in a repair shop, comprising:

downloading customer, vehicle, and repair shop order data of the vehicle from a central customer database into a work data memory device of a mobile communication interface;

connecting the mobile communication interface to the vehicle and connecting a first vehicle inspection device at least to the mobile communication interface at a first work station;

reading out the customer, vehicle, and repair shop order data from the work data memory device of the mobile communication interface in a control computer of the first vehicle inspection device;

carrying out a first set of inspections on the vehicle using at least one of the first vehicle inspection device and the mobile communication interface;

storing the first inspection results in the work data memory device of the mobile communication interface by the first vehicle inspection device;

disconnecting the first vehicle inspection device from the vehicle;

connecting a second vehicle inspection device to the vehicle and reading out the customer, vehicle, and repair shop order data as well as the first inspection results from the work data memory device of the mobile communication interface into the second vehicle inspection device at a second work station;

carrying out a second set of inspections of the vehicle using at least one of the second vehicle inspection device and the mobile communication interface connected to the vehicle on the basis of the first inspection results;

storing the second inspection results in the work data memory device of the mobile communication interface by the second vehicle inspection device; and reading out the customer, vehicle, and repair shop order data as well as the first and the second inspection results of the vehicle from the work data memory device of the mobile communication interface into the central customer database.

2. The method as recited in claim 1, further comprising:

connecting a universal operating and display device to the vehicle and reading out the customer, vehicle, and repair shop order data as well as the first and the second inspection results from the mobile communication interface into the universal operating and display device;

carrying out a third inspection of the vehicle using the universal operating and display device and the mobile communication interface connected to the vehicle at a third work station; and storing the third inspection results in the work data memory device of the mobile communication interface by the universal operating and display device.

3. The method as recited in claim 2, wherein at least one of the first vehicle inspection device, the second vehicle inspection device, and the universal operating and display device has a standardized diagnostic server device for establishing communication (i) with the mobile communication interface and (ii) with electronic control units installed in the vehicle, via the mobile communication interface.

4. The method as recited in claim 3, wherein at the first work station, the second work station, and the third work station, identification data stored in the mobile communication interface of the vehicle present in the repair shop are displayed on the first vehicle inspection device, the second vehicle inspection device, and the universal operating and display device, respectively.

5. The method as recited in claim 4, wherein the display of identification data at the first work station, the second work station, and the third work station takes place as a function of the proximity of the vehicle to the respective work station, the mobile communication interface being connected to the vehicle.

6. A mobile communication interface for identifying a vehicle and for communicating with electronic control units installed in the vehicle in a repair shop, comprising:

a connecting device configured to connect the vehicle in the repair shop to the mobile communication interface;

a work data memory device configured to store (i) customer, vehicle, and repair shop order data of the vehicle from a central customer database, (ii) at least one of inspection, diagnostic, and maintenance result data from at least one of corresponding inspection, diagnostic, and maintenance steps carried out on the vehicle in the repair shop; and a communication device configured to relay the customer, vehicle, and repair shop order data as well as the at least one of inspection, diagnostic, and maintenance result data to vehicle inspection devices and to exchange information between electronic control units installed in the vehicle and the vehicle inspection devices at different work stations in the repair shop.

7. The mobile communication interface as recited in claim 6, wherein the mobile communication interface is configured to be moved along with the vehicle to be connected in the repair shop.

8. A system for identifying and diagnosing a vehicle in a repair shop, comprising:

a mobile communication interface for identifying the vehicle and for communicating with electronic control units installed in the vehicle in a repair shop, the mobile communication interface including:

a connecting device configured to connect the vehicle in the repair shop to the mobile communication interface;

a work data memory device configured to store (i) customer, vehicle, and repair shop order data of the vehicle from a central customer database, (ii) at least one of inspection, diagnostic, and maintenance result data from at least one of corresponding inspection, diagnostic, and maintenance steps carried out on the vehicle in the repair shop; and a communication device configured to relay the customer, vehicle, and repair shop order data as well as the at least one of inspection, diagnostic, and maintenance result data to vehicle inspection devices and to exchange information between electronic control units installed in the vehicle and the vehicle inspection devices at different work stations in the repair shop; and multiple vehicle inspection devices each including:

a diagnostic server device for establishing communication with the mobile communication interface, and also with electronic control units installed in the vehicle, via the mobile communication interface;

an operating and display unit for controlling the vehicle inspection devices and the mobile communication interface; and multiple vehicle inspection modules configured to carry out vehicle-inspection-device specific vehicle inspections of the vehicle on the basis of the at least one of inspection, diagnostic, and maintenance result data.

* * * * *